E. E. LARSON.
FLEXIBLE SHAFT.
APPLICATION FILED SEPT. 5, 1917.

1,275,051.

Patented Aug. 6, 1918.

WITNESSES
F. C. Barry
B. Joffe

INVENTOR
Edward E. Larson
BY
Munn & Co.
ATTORNEYS

UNITED STATES PATENT OFFICE.

EDWARD E. LARSON, OF THOMPSON, IOWA.

FLEXIBLE SHAFT.

1,275,051. Specification of Letters Patent. Patented Aug. 6, 1918.

Application filed September 5, 1917. Serial No. 189,727.

*To all whom it may concern:*

Be it known that I, EDWARD E. LARSON, a citizen of the United States, and a resident of Thompson, in the county of Winnebago and State of Iowa, have invented a new and Improved Flexible Shaft, of which the following is a full, clear, and exact description.

My invention relates to flexible shafts.

An object of the invention is to provide a shaft consisting of a number of universal joints formed of few parts, and which can be easily assembled by machinery.

A further object of the invention is to provide a flexible shaft which can be easily repaired, extended or shortened without the need of machinery.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Fig. 1;

Figure 1:
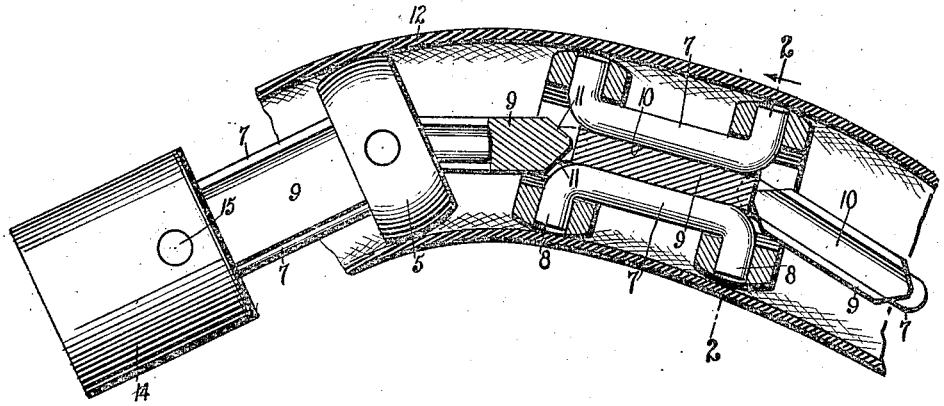
Figure 1 is a fragmentary longitudinal section through a shaft embodying my invention, certain parts of the same being broken out to show the details of construction.
Figure 2:
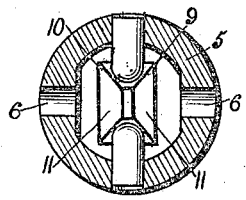
Fig. 2 is a cross section on line 2—2.

Referring to the drawings, 5 is a ring which has four radial holes 6 disposed at right angles to each other. The adjacent rings 5 are united by links 7 which are made of rounded-stock material and the ends 8 of which are bent at right angles to lie in the same plane and which enter the holes 6 of the ring. Any two adjacent rings 5 are united by two diametrically-opposite links 7. The links are prevented from dropping out from the rings by spacers 9 which are in the shape of blocks having channels 10 which form seats for the links 7. The spacers 9 have tapers 11 at the extremities to prevent interference between the spacers in the bending of the shaft. The outer surface of the ring is rounded or spherical to increase the flexibility of the shaft within a casing 12.

Figure 3:
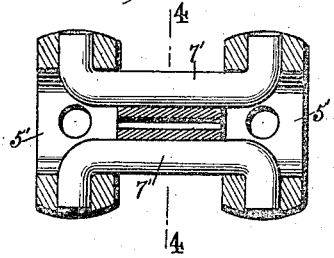
Fig. 3 is a longitudinal cross section through a link showing a modified form of spacer, used particularly in cases of repairing.
Figure 5:
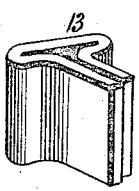
Fig. 5 is a perspective view of the spacer before it is placed into position.

In the modified form the spacer 13 is formed of a flat bar folded into the shape of a T (see Fig. 5) with the extremities lying at the bottom of the stem of the T. The width of the bar is slightly less than the distance between the rings, where they are disposed parallel to each other. The spacer, after being inserted between the bars (see Fig. 3) has its extremities bent to encompass each of the links 7', thereby retaining the links in the rings 5'. This arrangement of spacers permits the shortening or lengthening or reparation of the chain without the necessity of bringing the entire shaft back to the machinery which assembles them.

Figure 4:
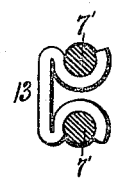
Fig. 4 is a cross section on line 4—4, Fig. 3.

On each end of the shaft a sleeve 14 is provided, of which only one is shown in Fig. 1; so that the connection between the shaft and the transmitting or receiving element can be easily accomplished. To retain the spacer 9 in position it is extended into the sleeve, and it is retained in the same by means of a pin 15 which passes through the sleeve and against which the spacer abuts. In consequence the spacer is anchored and cannot move longitudinally. The other spacers are prevented from longitudinal displacement by the adjacent spacers or by the rings 5', as will be the case in the structures shown in Figs. 3 to 5 inclusive.

While I have described the principle of operation, together with the device which I now consider to be the best embodiment thereof, I desire to have it understood that the device shown is merely illustrative and that such changes may be made as are within the scope of the appended claims.

I claim:

1. A flexible shaft comprising,— a plurality of rings each having radial holes disposed at right angles to each other, links of rounded stock having the extremities thereof bent at right angles for connecting adjacent links, each pair of rings being connected by a pair of diametrically disposed links, and a spacer for retaining said links in engagement with the holes of the rings.

2. A flexible shaft comprising, a plurality of rings each having radial holes disposed at right angles to one another, links connecting diametrically-opposite openings of the same ring to the diametrically-opposite openings of an adjacent ring so that the links are in a common plane, and spacers engaging said links for retaining the same in engagement with the rings.

3. A flexible shaft comprising, a plurality of rings each having radial holes at right angles to one another, rounded-stock links each having the extremities thereof bent at right angles to engage an aperture of a ring, and spacers having channeled portions for engaging the links between the rings to prevent an accidental disengagement of the links from the rings.

4. A flexible shaft comprising,—a plurality of rings each having radial holes disposed at right angles to one another, diametrically-opposite links, each of said links being formed of rounded stock with extremities bent at right angles to engage the holes in the rings, and a spacer having oppositely-disposed channeled portions for engaging the links connecting the adjacent rings and prevent an accidental disengagement of the links from the rings.

EDWARD E. LARSON.

Copies of this patent may be obtained for five cents each, by addressing the "Commissioner of Patents, Washington, D. C."